Oct. 13, 1931.  C. FIELD  1,826,758
WINDING AND UNWINDING MECHANISM
Original Filed June 18, 1927   3 Sheets-Sheet 1
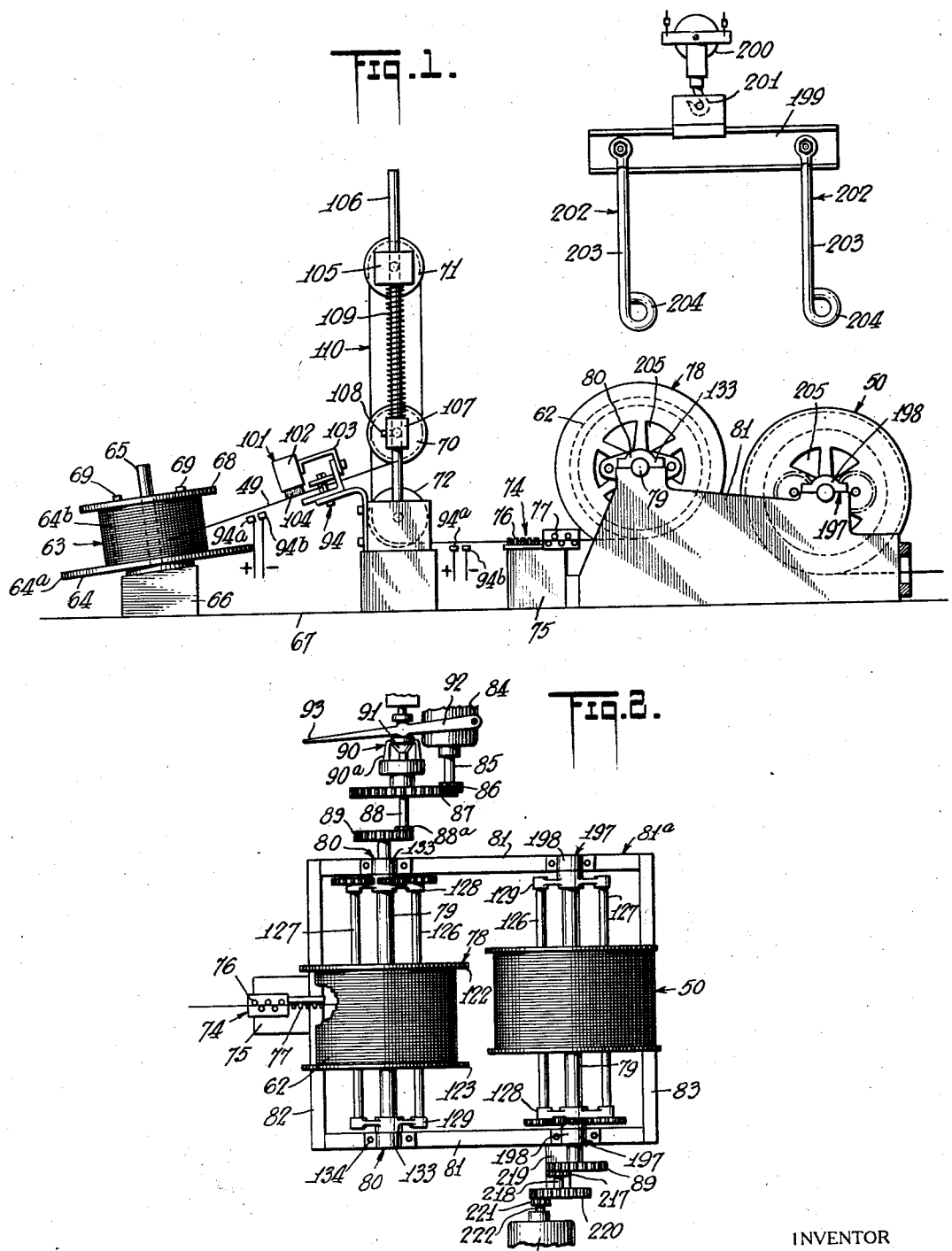

Oct. 13, 1931.   C. FIELD   1,826,758
WINDING AND UNWINDING MECHANISM
Original Filed June 18, 1927   3 Sheets-Sheet 2
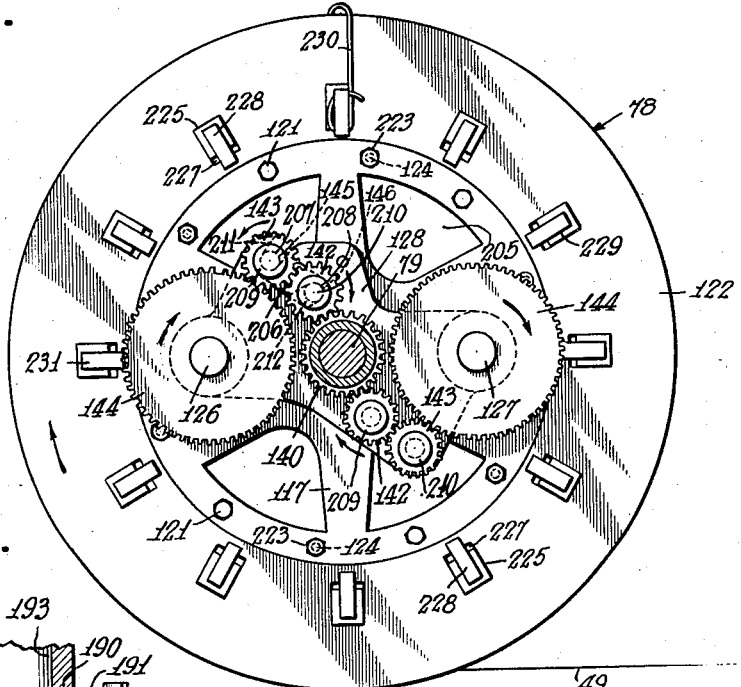
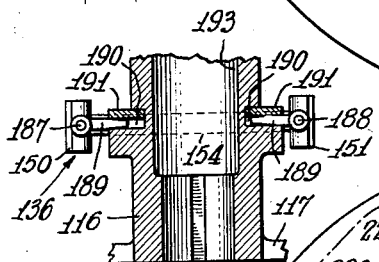
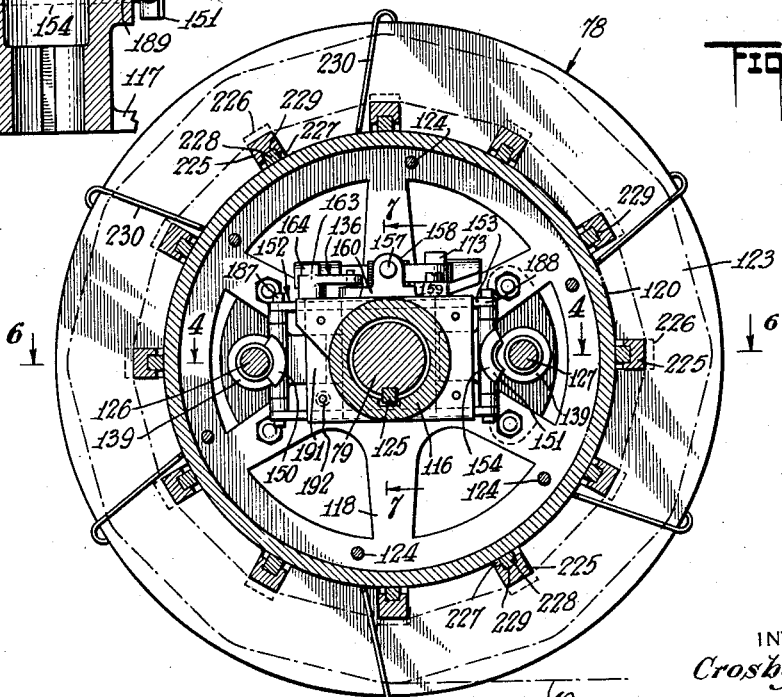
INVENTOR
*Crosby Field*
BY
*George A. Mann*
ATTORNEY Oct. 13, 1931.  C. FIELD  1,826,758
WINDING AND UNWINDING MECHANISM
Original Filed June 18, 1927  3 Sheets-Sheet 3
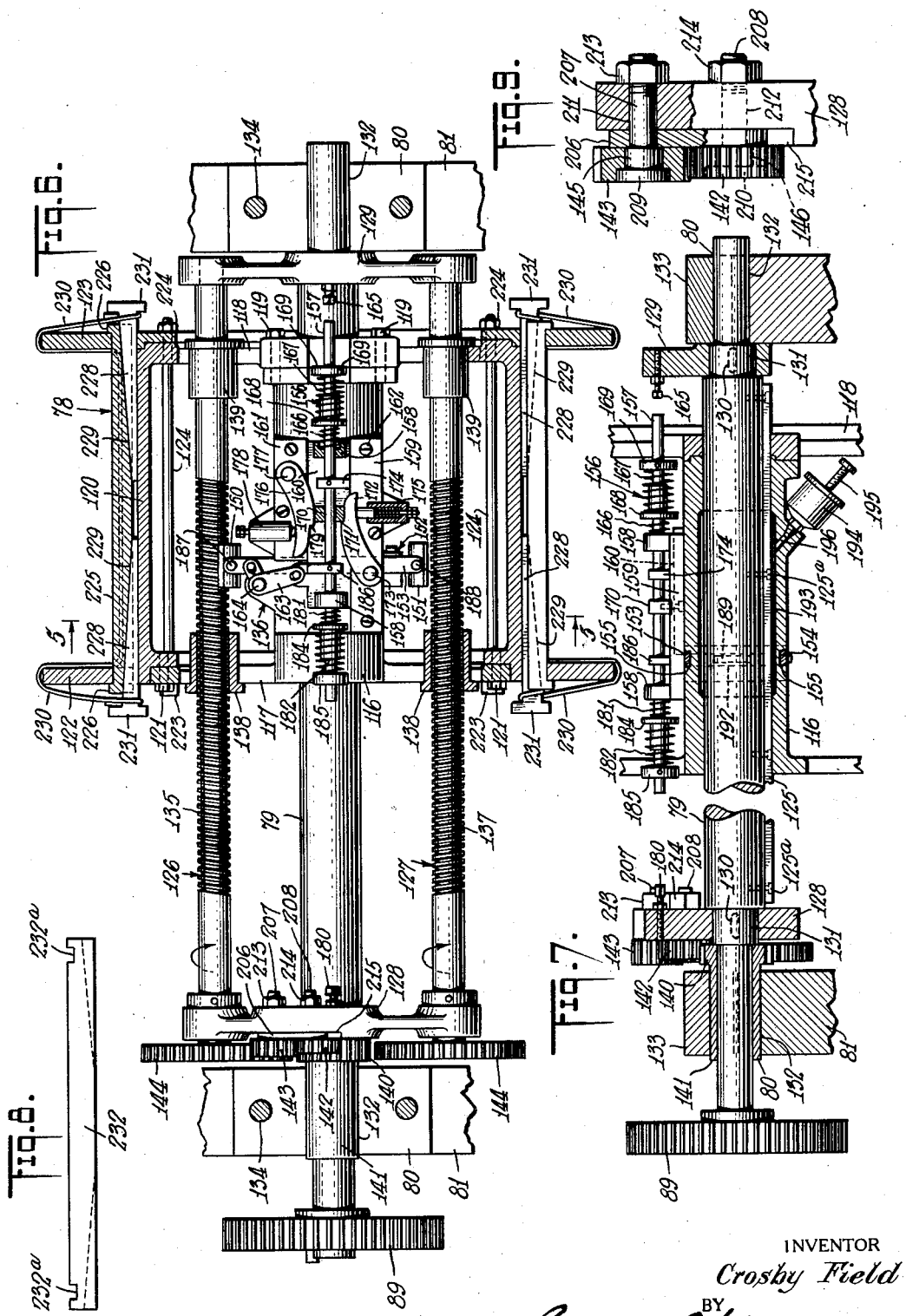
INVENTOR
*Crosby Field*
BY
*George C. Shoup*
ATTORNEY Patented Oct. 13, 1931

1,826,758

UNITED STATES PATENT OFFICE

CROSBY FIELD, OF BROOKLYN, NEW YORK

WINDING AND UNWINDING MECHANISM

Original application filed June 18, 1927, Serial No. 199,692, and in Canada June 11, 1928. Divided and this application filed August 3, 1928. Serial No. 297,316.

My present invention relates more particularly to reel adapted to the purposes set forth in my copending application, Ser. No. 199,692, filed June 18, 1927, of which this application is a division, and also in my Patents Nos. 1,608,478 and 1,608,481, dated November 23rd. 1926, and while many of its features are adapted for use in other relations, most of them have advantages that are better understood in connection with the requirements of machines such as set forth in my said application. These machines are for making metal wool from wire, and a number of large cutting units are employed each consisting of a traction rotor having a plurality of adjacent grooves formed in its periphery, in which the wire is frictionally engaged so that it is carried by the rotor, operating as a bed, in operative relation to a series of stationary cutters arranged around the periphery. The necessary friction to hold the loops of wire as it were integral with the periphery of the rotor is insured by end tension on the wire. My present construction of reel is well adapted to afford this end tension.

Preferably, a single wire is led in a succession of loops curving in the same direction, around a number of the cutter units, large enough to enable the wire to be cut to scrap. In such a machine, it is highly desirable to have reels of capacity sufficient to accommodate great lengths of wire. The ordinary bundle coils obtainable in the market are of limited length, weighing approximately 300 pounds, and in this connection the reel which I employ is one on which a number of coils of the usual weight may be wound, the end of the wire of one coil being welded to the end of the wire of the next succeeding coil, thus producing a single coil which may weigh, say, 4,000 pounds and may be between 1 and 2 miles in length even when heavy wire is employed.

The above and other purposes are employed in a wheel construction adapted to level wind the wire under heavy tension, the mechanism being such that it may be quickly shifted from winding to unwinding. In the above machine, the winding operation may be for the purpose of supplying the original welded lengths of wire to the reel or for winding up the scrap at the end of the machine while the principal unwinding use is at the supply end of the machine, but only the first winding and the machine supply positions are indicated herein.

The winding operation is in connection with means for testing and breaking any bad spots in the wire before it passes to the reel, the means shown including a friction device which is adjustable so as to produce an excess tension on the wire, such as is found by experience, the uncut wire should withstand in order to ensure against rupture in the machine, after the wire has been weakened by shaving. Thus, when the testing strain comes on a bad portion of the wire and it breaks, the defective portion can be cut out and the good ends rewelded in the testing machine. The wire tension required will vary with the kind and size of material that is to be wound. This testing machine is more fully described and claimed in another divisional application Ser. No. 297,320 filed August 3, 1928.

The wire is conducted to the winding reel through a stationary straightener and for level winding it is necessary to have the winding reel feed back and forth axially of its shaft at a rate dependent on the size of the wire. The feeding mechanism may include two screws extending parallel with the reel supporting shaft, which screws are supported by brackets on said shaft to revolve about the latter. To rotate the screws, there is provided planetary gearing operable by a fixed central or sun gear supported on the axis of the reel shaft, said gearing including gears on the feed screws. Screw engaging means may be supported on the reel, which is shiftable from one screw to the other in order to reverse the axial feed of the reel.

The means for automatically effecting the reversal of the feed of said reel includes a trigger mechanism, which is operated at the end of the feed of the reel, in either direction, to shift the screw engaging mechanism from one screw to the other.

After the reel has become filled, it may be interchanged with the reel from which the wire is supplied to the machine. When the wire is unwound into the cutting machine, the transverse feeding mechanism may be rendered ineffective and to this end I have provided means to facilitate disconnection of the gears on the feed screws from the sun gear, the pinions in the planetary gearing being carried on a support which is adjustable so as to take one of said pinions out of engagement with the gear of the feed screw. The pinions are also settable to reverse the rotation of the feed screws.

The reel at the exit end of the machine for receiving the wire, which has been reduced to scrap, may be similar in construction to the winding reel and the supply reel. The strains to which these reels are subjected are very great due to the weight of the wire handled thereby. Accordingly, the drum is constructed so as to withstand these strains.

The reel is also constructed so as to facilitate the removal of the coil of waste wire therefrom. To this end, one of the flanges of the reel is detachably supported thereon and held in place by suitable bolts. To further assist in holding the flange on the drum, and to reenforce the reel, there are provided cross bars or beams which may be inserted through suitable slots formed in both flanges. They extend over a drum part of the reel and engage both flanges; said beams being held in cooperative relation therewith by suitable wedges which are forced in between the surface of the drum and the beams. The wire, instead of being supported directly by the drum part of the reel, is supported by the beams which are placed around the periphery of the drum. This leaves space between the beams in which suitable binding wires may be placed before the waste wire is started on the reel. These binding wires extend over the flanges of the reel and their ends may be twisted around the wedges which hold the beams in place. When the reel is filled, the ends of the binding wires are untwisted from the wedges and folded over the reel to bind it together. The reel may then be removed with its supporting shaft from the bearings, in any suitable manner, after which the wedges are withdrawn to enable the beams to be removed from the reel. The detachable flange may then be removed, and the reel is then set up on end so as to cause the coil of wire to slide from the drum at the end from which the flange has previously been removed. After the coil of waste wire has been removed, the reel may be re-assembled.

The above and other features of my invention will be more evident from the following description in connection with the accompanying drawings, in which Fig. 1 is an end view of the two reels, one in winding relation to the tension supply means and the other in unwinding relation to a machine to be supplied;

Fig. 2 is a top plan view of the righthand portion of Fig. 1;

Fig. 3 is an end elevation of the reel;

Fig. 4 is a detail sectional view taken on the line 4—4 of Fig. 5;

Fig. 5 is a sectional view taken on the line 5—5 of Fig. 6;

Fig. 6 is a sectional top plan view of the reel, taken on the line 6—6 of Fig. 5;

Fig. 7 is a detail sectional view of the reel, taken on the line 7—7 of Fig. 5;

Fig. 8 shows another form of beam or bar used in the reel; and

Fig. 9 shows the manner of mounting the transmission pinions which drive the feed screws of the reel.

As shown in Figs. 1 and 2, a large coil of wire, 62, may be produced from smaller coils 63 successively placed on a drum 64, having a base flange 64a and a core 64b mounted to rotate about a shaft 65 extending upwardly from a support or block 66 on the floor 67. A detachable flange 68 may be secured to the core 64b by screws or bolts 69, to enable the coil 63 to be placed on the reel. The wire 49 is conducted from the reel 64 around rollers 70, 71 and 72, hereinafter described, through a wire straightener 74, supported on a stationary block 75; said straightener having vertically disposed rollers 76 and horizontally disposed rollers 77 between which the wire 49 passes. It is conducted from the straightener 74 to the winding reel 78, carried by a shaft 79. The shaft 79 is rotatably supported in bearings 80 formed in walls 81 of a reel supporting frame 81a, said walls being connected to each other by cross-bars 82 and 83. The reel 78 is rotated in a counter clockwise direction in Fig. 1 to thus draw the wire 49 from the coil 63 and wind it up.

To drive the shaft 79 and thus rotate the reel 78 in order to wind up the wire 49, there may be provided an electric motor 84, (Fig. 2), having a shaft 85 with a pinion 86 to drive a gear 87, which gear may rotate freely on a suitably supported shaft 88; said shaft having a pinion 88a to drive a gear 89 secured to shaft 79. The gear 87 may be connected with the shaft 88 at will through the medium of a clutch 90, including levers 90a which may be separated by a cone 91 slidable on the shaft 88 to operate the clutch; said cone being operable by a lever 92 having a handle 93. By swinging the lever 92 upwardly in Fig. 2, the cone is withdrawn from beneath the clutch levers 90, thus disconnecting the gear 87 from the shaft 88 and thus stopping the rotation of the winding reel 78.

When the end of a coil 63 of wire is reached, the rotation of the winding reel 78 is stopped by a manipulation of the clutch controlling lever 92. The flange 68 of the reel 64 is then removed and a fresh coil placed on the core 64b. The end of wire from the fresh coil may then be welded to the end of the wire of the preceding reel by any suitable welding device as 94a, 94b after which the clutch controlling lever 92 is operated to connect the winding reel 78 with the motor.

For testing and breaking weak spots in the wire, as well as winding the wire under proper tension, I provide a friction drag 94, against the pull of the reel 78. The drag includes two blocks that clamp the wire and the clamping effect may be adjusted as set forth in my copending applications referred to above. The tension is adjusted so that any part of the wire that is defective enough to break in the shaving machine will be broken in the tester. The defective part is then cut out and the good ends are welded. The tension required for this purpose, is amply sufficient for tight winding of the wire on the reel 78.

To prevent undue wear of the friction drag 94 and scoring of the wire by the blocks, as well as to ensure smooth uniform winding tension, there may be provided a lubricating device 101, which may include a cup 102 supported on a fixed bracket 103. Extending from the lower part of the cup 102 is a felt pad 104 which engages the wire to apply the lubricant thereto from the cup 102.

The uniformity of the tension on the wire while it is being wound on the reel 78 is further promoted by the tension indicating means which include a roller 71, which is floatingly supported by blocks 105 slidingly mounted on vertical rods 106. A stationary guide roller 70 is also supported on the rods 106 by means of blocks 107 which are secured to said rods by screws 108. Springs 109, coiled around the rods 106, are interposed between the fixed blocks 107 and the sliding blocks 105, to urge upwardly the blocks 105 with the roller supported thereby. The wire 49 passes from the friction device 94 to the roller 70, then upwardly over and around the roller 71, and then downwardly to form a loop 110. The wire extends around the fixed axis roller 72 to the reel 78, as previously described.

The length of loop 110 varies according to the adjustment of the friction device 94. When the pressure of the friction device 94 is increased, the tension of loop 110 is increased thus pulling the roller 71 downwardly against increasing opposition of the springs 107

The reel structure includes a hub portion 116 to slide on the shaft 79 (Figs. 2 to 7 inclusive) and two spoked ends 117 and 118, the end 117 being integral with the hub 116, the end 118 being secured to the hub by screws 119. The reel further includes a drum 120 which may be integral with the spoked end 118 and extends therefrom to the spoked end 117, where it is secured to the latter by screws 121. End flanges 122 and 123 confine the coil of wire on the drum. The flange 122 may be integral with the drum 120. The flange 123, however, may be detachably secured to the reel by bolts 124, so that the coil of wire may be readily removed from the reel in a manner hereinafter described.

The reel 78 is caused to rotate with the shaft 79 by means of a key 125 extending along the shaft, which key may be secured thereto by screws at 125ª (Fig. 7). Provision is made to feed the drum axially on said shaft, first in one direction and then in the other as the wire is wound on the reel and advances from one flange to the other.

To feed the reel 78 axially on the shaft 79, while it is being rotated to wind up the wire, screws 126 and 127 are provided, said screws being supported at one end in a bracket or cross bar 128 and at the other end by a bracket or cross bar 129, said brackets being secured by keys 130 (Fig. 7) on reduced portions 131 of the shaft 79. The shaft lies in depressions 132 of the bearings 80 and is held in place by bearing caps 133 secured to the end walls in any suitable manner as by screws 134.

The screw 126 is provided with a left hand thread 135 to feed the reel in one direction (to the right in Fig. 7) by a screw engaging device or mechanism 136, hereinafter described, carried by the reel. The screw 127 is provided with a right hand thread 137 which is effective, when cooperating with the screw engaging mechanism 136, to feed the drum in the opposite direction, which is to the left in Fig. 7. The screws 126 and 127 extend through bearings or guides 138 and 139 (Figs. 5 and 7) secured respectively to the spoked ends 117 and 118 of the reel; the screws being caused to rotate in the direction of the screws as indicated (Figs. 3 and 6) when the wire is being wound on said reel.

To effect rotation of the feed screws 126 and 127, there may be provided planetary gearing including a central or sun gear 140, which may be integral with a bearing sleeve 141 for the left-hand end of the shaft 79 (Figs. 6 and 7), said bearing sleeve being held securely on the end plate 81 of the frame work by the cap 133. Each feed screw is rotated by a pinion 142 meshing with the sun gear 140, the pinion 142 meshing with an intermediate pinion 143 which drives a gear 144, there being two of these trains of gearing, one for each screw. The pinions 142 and 143 rotate on studs 145 and 146, respectively, secured to the cross bar 128 which, it will be remembered, supports the screws 126 and 127 at one end. Thus, as the shaft 79 rotates in a clockwise direction (Fig. 3) to wind the wire on the reel, the pinions 142 and 143 and the gear 144 are carried bodily around the sun gear 140 and since the pinion 142 meshes with said sun gear, it is caused to rotate and thus drive the gear 144 through the intermediate pinion 143, thus rotating the screw 126 to feed the reel to the right in Fig. 6. Thus during the rotation of the shaft 79, both screws 126 and 127 are rotated in the same direction through planetary gearing, said direction depending on the position of the screw engaging mechanism 136.

The screw engaging mechanism 136 includes a follower or half nut 150 to cooperate with the screw 126 and a follower or screw engaging element 151 to cooperate with the screw 127. Said followers are supported on a slide 152 including bars 153 and 154 (Figs. 5 and 6), which bars are suitably guided in slots 155 formed in the hub 116 of the reel 78. The slide 152 may be shifted, in a manner hereinafter described, transversely of the hub 116 to disengage the screw 126 and to engage the screw 127, to effect the reversal of the feeding of the reel, when the wire being wound on the reel reaches the flange 122.

The reversal of the feed of the reel 78 which results from the shifting of the screw-engaging mechanism 136, is effected automatically. To this end there is provided a trigger mechanism 156 (Figs. 6 and 7), operated in a manner hereinafter described, which mechanism may include a plunger 157 supported in brackets 158 of a slide 160 supported between guide-ways 159 and 161, which guide-ways may be secured to the hub 116 by screws 162.

The slide 160, which may be moved in the direction of the plunger 157, in the manner hereinafter described, may be connected with the bar 153 of the screw engaging slide 152 by means of a bell crank 163 pivoted on a stud 164 secured to the hub 116, so that when the slide 160 is moved to the left in Fig. 6, the bell crank is swung about its pivot 164 to move the screw engaging slide 152 out of engagement with the feed screw 126 and into engagement with the feed screw 127. When the slide is moved in the opposite direction, however, the screw engaging slide is disconnected from the feed screw 127 and connected with the feed screw 126.

To operate the plunger 157 of the trigger mechanism, it engages a stop or set screw 165 adjustably secured to the cross bar or bracket 129 during the rightward feed of the reel in Fig. 6. After the plunger engages the stop, the reel continues to feed rightwardly, thus causing a relative leftward movement of the plunger 157 against the action of the springs 166 and 167; the spring 166 being held between the bracket 158 and a flange sleeve 168 slidingly supported on the plunger 157, and spring 167 being supported between the flange sleeve 168 and a collar 169 secured to the plunger. These springs are compressed when the plunger is operated and tend to force the slide 160 leftwardly. Said slide is locked, however, by a lug 170 secured thereto and extending upwardly therefrom into engagement with a shoulder 171 of a pawl 172 pivotally supported by a stud 173 on the fixed guide-way 159. The plunger 157 slides freely through the lug 170 and as it moves leftwardly, a finger 174 secured thereto, engages the free end of the pawl 172 to swing said pawl about its pivot 173, against the action of a spring pressed plunger 175 to disengage said pawl from the lug 170. Immediately following the release of the slide 160, it is moved leftwardly by the action of the springs 166 and 167, to thus actuate the bell crank 163 in a clockwise direction and thus shift the screw engaging slide or device 152 out of engagement with the feed screw 126 and into engagement with the feed screw 127. After the shifting of the screw engaging device 152, a pawl 176, similar to the pawl 172, is swung about its pivot 177 by a spring pressed plunger 178 to cause a shoulder 179 of said pawl to engage behind the lug 170 of the slide 160 and thus hold said slide against the rightward movement or, in other words, locking the screw engaging device 152 in engagement with the feed screw 127. It will be understood that the pawl 172, when effective, holds the slide 160 against leftward movement, to lock screw engaging device 152 in engagement with the feed screw 126.

Thus, when the screw engaging device is in engagement with the feed screw 127, it is fed leftwardly until the lefthand end of the plunger 157 strikes an adjustable stop 180 secured to the cross bar or bracket 128, to effect an actuation of the reversing mechanism, as the drum approaches its extreme lefthand position. When the plunger engages the stop 180, it is moved against the action of springs 181 and 182, the spring 181 being confined between bracket 158 secured to the slide 160, and a sleeve 184 carried by the plunger 157, the spring 182 being confined between said sleeve and a collar 185 secured to the plunger 157. The springs 181 and 182 are similar to the springs 166 and 167 at the opposite side of the plunger, and they tend to move the slide 160 rightwardly in Fig. 6, said slide being locked, however, by the pawl 176. As the plunger advances in its rightward movement, a finger 186 thereon swings the pawl 176, against the action of the spring pressed plunger 178, out of engagement with the lug 170, thus releasing the slide 160. Subsequently, the action of the springs 181 and 182 actuate the slide to move it rightwardly and thus actuate the bell crank 163 in a counterclockwise direction to thus move the screw engaging device 152 out of engagement with the feed screw 127 and into engagement with the feed screw 126, to again effect a leftward feed of the reel 78.

To effect easy engagements of the screw engaging elements or half nuts 150 and 151 with the feed screws 126 and 127, respectively, modified square threads may be used which are slightly tapered, each thread being slightly narrower at the outside than at the base, so as to afford easy entrance of the internal threads of the half nuts between the threads of the screws. The half nuts 150 and 151 are each swingingly supported by pivots 187 and 188 (Figs. 4, 5 and 6) so that said elements may adjust themselves to the screws in effecting an engagement therewith. The pivotal movement of said half nuts is comparatively slight, however, and is limited by tails 189 extending from each into a slot 190 formed in the hub 116, and by vertical bars or straps 191 secured to said hub. By inspection of Fig. 4, it will be noticed that said tails 189 are slightly tapered and actuate the full width of the slot when in their ineffective positions, thus preventing shaking thereof. When moved to their effective positions, however, into contact with the screw, the wide end of the tail moves out of the slot and the narrow end advances in the slot, thus permitting sufficient pivotal movement of the screw engaging element or half nut to accommodate itself to the feed screw. The straps 191 may be secured to the hub by screws 192 (Fig. 5) and also assist in holding the bars 153 and 154, of the screw engaging device or slide 152, in their slots or guideways.

To lubricate the reel supporting shaft 79 so as to prevent undue rubbing and consequent wear of the reel on said shaft, there may be provided a lubricating or grease chamber 193 (Fig. 7) formed in the hub 116 of the reel; said chamber extending around the shaft 79. A grease cup 194, which may be filled in any well known manner, is provided with a screw 195 to force the grease at will from said cup through a duct 196 into the grease chamber 193.

After the reel 78 has been wound full of wire in the testing mechanism, it may be removed from the bearing 80 and placed on a bearing 197 to supply the wire thereon to the cutting units or shaving machine. It will be understood that while the wire is being wound on the reel 78, it is supported on bearing 80 and the reel 50 is being unwound; the latter may become exhausted about the same time that the winding reel becomes filled. Accordingly, the reels 50 and 78 may be interchanged in a single operation.

To facilitate the interchanging of the filled reel and the empty reel, the bearing cap 133 and a bearing cap 198 of the bearing 197 are removed. A swinging beam 199 (Fig. 1) is then lowered by a hoist 200 on which the beam is carried by means of a hook 201. The beam is provided with two yokes 202, including arms 203 provided with eyes or loops 204 at their lower ends. As the beam 199 is lowered, the yokes 202 straddle the reels 50 and 78 and the eyes 204 are brought into alignment with apertures 205 formed in the spoked ends of the reels. Straight bars (not shown) may then be inserted through the eyes 204 and through the apertures 205 to thus connect the reels with the yokes 202, after which the reels may be elevated by means of the hoist 200, the bearing caps 133 and 198 having previously been removed. After the reels are raised clear of the side walls 81 of the reel supporting frame, the beam 199 is turned around in the opposite direction so as to interchange the positions of said reels. The reels may then be lowered by the hoist 200 so as to locate the filled reel on the bearing 197, from which reel the wire is then supplied to the shaving machine, and locate the empty reel 50 on the bearing 80 to receive a fresh supply of wire. It will be understood that after the reels have been interchanged, the bearing caps 133 and 198 are again secured in position. The point of application of the hoist 200 is located in a position on the beams 199 so that the reels 50 and 78, when carried by said beam, balance each other.

It will be understood that the planetary gearing, including the sun gear 140, is carried by the shaft 79 and consequently it is interchanged with the reel. When, however, the reel is placed on the bearing 197, the reel feeding means is thrown out of action so that the reel may remain in a fixed position lengthwise of the shaft 79. Suitable means, hereinafter described, being provided to conduct the wire from the supply reel to the first bed of the shaving machine.

To disconnect the reel feeding mechanism, the pinions 142 and 143 of the planetary gearing which, it will be remembered is effective to rotate the feed screws 126 and 127, are carried by a support or bar 206, adjustably mounted on the cross bar of bracket 128 (Figs. 3, 6 and 9) so that the pinions 143 may be swung out of engagement with the gears 144 of the feed screws 126 and 127, said pinions rotating idly when the wire is being unwound from the reel.

To shiftingly support the pinions 142 and 143, the studs 145, 146 constitute the ends of bolts 207 and 208, respectively, said studs having heads 209 and 210 upon which the pinions are rotatably supported. The bolts extend through the bar 206 and through slots 211 and 212 formed in the cross bar 128, said bolts being held in place by nuts 213 and 214 which draw the bar 206 tightly against a depressed face 215 formed on the cross bar 128. When it is desired to disconnect the pinion 143, the nuts 213 and 214 are loosened and the pinion carrying bar 206 is swung about the bolt 208 to carry the pinion 143 out of engagement with the gear 144, after which the nuts 213 and 214 are again tightened to secure the pinions in their ineffective positions.

In another adjustment of the pinion carrying bar 206, each feed screw 126 and 127 may be connected to rotate in the opposite direction. It will be seen by an inspection of Fig. 3, that the slot 212 is slightly elongated and after the nuts 213 and 214 have been loosened, the bolt 208 may be moved to the other end of the slot so as to carry the pinion 142 into engagement with the gear 144, the pinion 143 being at the same time disengaged from the gear 144, so that the gear 144 of the screw is rotated directly by the pinion 142 instead of the pinion 143. It will be understood that the nuts 213 and 214 are again tightened after the setting of the pinions.

When the reel is used to supply wire to the shaving machine, an ordinary cylindrical drum is used and the mechanism is connected with suitable breaking means to assist in keeping the wire taut, in this case an electric generator 216 connected to the reel supporting shaft 79. As the reel is rotated by the unwinding of the wire, the gear 89 on the shaft 79 drives a pinion 217 secured to a shaft 218 supported in a bracket 219, which bracket may be secured to the wall 81 of the reel supporting frame. The shaft 218 has secured thereto a gear 220 driving a pinion 221 secured to the generator shaft 222. Thus it will be understood that the generator serves as a breaking means not only to keep the wire taut, but also to assist in bringing the reel to a stop when the shaving machine is stopped.

When a wire coil is to be removed bodily from the reel, as for instance, when the reel is used to wind up the waste wire at the exit end of the machine, the removal is facilitated by having the flange 123 (Fig. 6) detachably supported thereon and held in its assembled position by bolts 124, having heads 223 engaging one side side of the reel and nuts 224 engaging the flange 123 at the other end of the reel. Beams or bars 225 are arranged around the periphery of drum 120 of said reel. Each beam has projections 226 at its ends to engage the outside of the flanges 122 and 123 to thus prevent spreading thereof, and consequently assist in holding the flanges 123 on the reel. Said beams 225 are located in slots 227 formed in the flanges 122 and 123 (Fig. 3) which slots are large enough to permit insertion or removal of said beams therethrough. After the insertion of each beam through a slot, it is moved radially on the reel, and away from the reel axis, into engaging relation with the flanges 122 and 123 to hold each beam in its effective holding position. Wedges 228 are provided which extend into grooves 229 formed in the beams, said wedges engaging the bottom of said grooves and the periphery of the drum. With this arrangement, the wire is not carried directly by the drum 120, but is supported by the beams 225, as indicated in Fig. 5, so that stresses produced by the weight of the wire are actually in the ends of the reel and not in the drum 225. When the reel is thus used for tension winding of scrap, the feeding mechanism, including the screws 126, 127, operates as previously described in connection with the testing mechanism.

To facilitate the removal of a coil of wire from the reel, binding wires 230 may be stretched over the drum from side to side thereof and bent over the flanges 122 and 123 so that their ends may be twisted around the protruding ends of the wedges 228. When the reel has become filled, the ends of the binding wires are untwisted from the wedges and are brought together and twisted over the coil to thus bind the latter. After the coil has been thus bound, the reel, with its supporting shaft 79, may be removed from its bearings. The wedges may then be removed, their ends being provided with heads 231 to be engaged by a suitable wedge removing tool, not shown. After the wedges have been removed, each bar may be moved radially toward the axis of the drum, to enable it to be withdrawn through the slots 227. The flange 123 may then be removed from the drum 120 by loosening the nuts 224. The reel is then set up on end so as to cause the coil of wire to slide down from the drum at the end from which the flange has previously been removed. After the removal of the coil of waste wire, the reel may be reassembled for future use.

A modified form of beam 232 (Fig. 8) may be used instead of the beam 225, and it may be provided with slots 232a so that each of the flanges 122 and 123 may be embraced by the bar or, in other words, engaged on both sides, thus adding to the rigidity of the reel.

I claim:—

1. In combination, a reel for wire, means to rotate said reel, a shaft to support said reel, a non-rotating pinion, two screws carried bodily with said reel while it rotates, gearing to connect said screws with said pinion to rotate said screws while they are moving bodily with the rotation of the reel, and means on said reel to engage either screw to cause said reel to feed axially on its shaft in either direction.

2. In combination, a reel for wire, means to rotate said reel, a shaft to support said reel, a non-rotating pinion, two screws carried bodily with said reel while it rotates, gearing to connect said screws with said pinion to rotate said screws while they are moving bodily with the rotation of the reel, means on said reel to engage either screw to cause said reel to feed axially on its shaft in either direction, and means to automatically shift the screw engaging means from engagement with one of said screws into engagement with the other screw.

3. In combination, a reel for wire, means to rotate said reel, a shaft to support said reel, a non-rotating pinion, two screws carried bodily with said reel while it rotates, gearing to connect said screws with said pinion to rotate said screws while they are moving bodily with the rotation of the reel, means on said reel to engage either screw to cause said reel to feed axially on its shaft in either direction, trigger mechanism operable automatically at the end of the travel of the reel in each direction, and means connecting the trigger mechanism with the screw engaging means to shift the latter from one screw to the other.

4. In combination, a reel for wire, a shaft to support said reel, two screws extending parallel with said shaft, two cross pieces secured to said shaft and at opposite sides of said reel, said cross pieces supporting the ends of said screws, a transverse element on said reel to engage either of said screws one at a time, means to rotate said reel, means to rotate said screws while the reel is rotating to effect the axial feeding of the reel in either direction according to the position of the transverse element.

5. In combination, a reel for wire, a shaft to support said reel, two screws extending parallel with said shaft, two cross pieces secured to said shaft and at opposite sides of said reel, said cross pieces to support the end of said screws, a transverse screw engaging slide, an axially disposed slide, a bell crank by which axial slide may shift the transverse slide from one screw to the other to effect a reversal of axial feed of the reel, and trigger mechanism including a plunger carried by said reel to engage said cross pieces to actuate the axial slide.

6. In combination, a reel for wire, a shaft upon which said reel is mounted to rotate therewith and to slide axially thereof, two screws to feed the reel axially in opposite directions on said shaft, means on said shaft to support said screws, means to rotate said shaft, means to rotate said screws, screw engaging means on said reel, and automatic means to disconnect the screw engaging means from one screw and connect it with the other screw when the reel reaches the end of its axial travel in either direction.

7. The combination, a reel for wire, a rotatable shaft, means to cause said reel to rotate with said shaft and to permit the reel to slide axially thereon, two rotatable screws supported on said shaft, means on the reel to engage either screw one at a time to feed the reel axially in opposite directions on said shaft, a pinion, means to secure said pinion against rotation, a gear on each screw, and gearing connecting each screw gear with the fixed pinion.

8. In combination, a reel for wire, a rotatable shaft, means to cause said reel to rotate with said shaft and to permit the reel to slide axially thereon, two rotatable screws supported on said shaft, means on the reel to engage either screw one at a time to feed the reel axially in opposite directions on said shaft, a pinion, means to secure said pinion against rotation, and planetary gearing connecting the screws with the fixed pinion to rotate said screws while the reel is rotating.

9. In combination, a reel for wire, a rotatable shaft, means to cause said reel to rotate with said shaft, two rotatable screws supported on said shaft, means on the drum to engage either screw one at a time to feed the reel axially in opposite directions on said shaft, a pinion, means to secure said pinion against rotation, and planetary gearing connecting each screw with the pinion to rotate the screw while the drum is rotating, and means to facilitate a disconnection between the screw and the pinion.

10. In combination, a reel for a rotatable shaft, means to cause said reel to rotate with said shaft and to permit the reel to slide axially thereon, a rotatable screw supported on said shaft, a fixed pinion, means including planetary gearing connecting said screw with the pinion to rotate said screw while the reel is rotating, said planetary gearing including a pinion, and means to render the last named pinion ineffective to enable the rotation of the reel without feeding it.

11. In combination, a reel for wire, a rotatable shaft, means to cause said reel to rotate with said shaft, a pinion, means to secure said pinion against rotation, means including planetary gearing connected with the pinion to feed the reel axially on the shaft while the reel is rotating, and means to facilitate a disconnection between the gearing and the pinion.

12. In combination, a reel for a rotatable shaft, means to cause said reel to rotate with said shaft, rotatable screws supported on said shaft to feed the reel axially, a driving pinion, gearing connecting the screw with the driving pinion to rotate the screw in one direction while the reel is being rotated, and means to shift the gearing to rotate the screw in the opposite direction.

13. In combination, a reel for wire, a rotatable shaft, means to cause said reel to rotate with said shaft, a driving pinion, means including gearing connected with the pinion to feed the reel axially in one direction, and means to shift the gearing to feed the reel in the opposite direction.

14. In combination, a wire controlling reel, a rotatable shaft, means to cause said reel to rotate with said shaft and to permit the reel to slide axially thereon, two rotatable screws supported on said shaft, means on the reel to engage either screw one at a time to feed the reel axially in opposite directions on said shaft, a driving pinion, a gear on each screw, two sets of meshing intermediate gears connecting each gear of the screws with the driving pinion to rotate each screw in one direction when the reel is being rotated, each set having two gears, a support for each set of intermediate gears, and means to facilitate an adjustment of each support to shift the intermediate gears to render one of the intermediate gears ineffective and connect the gear of the screw directly with driving pinion through the medium of the other intermediate gear to cause the screw to rotate in a reverse direction.

Signed at New York, in the county of New York, and State of New York this 31st day of July, A. D. 1928.

CROSBY FIELD.